United States Patent [19]
Trivett

[11] 3,871,038
[45] Mar. 18, 1975

[54] PORTABLE BED

[76] Inventor: Junior Albert Trivett, 130 3rd Ave. Northeast, Conover, N.C. 28601

[22] Filed: Sept. 3, 1974

[21] Appl. No.: 502,965

[52] U.S. Cl. .................. 5/121, 182/187, 248/231
[51] Int. Cl. ........................ A45f 3/22, A47c 9/10
[58] Field of Search ................. 248/221, 230, 231; 5/112–128; 182/187, 188; 297/217; 135/5, DIG. 6, DIG. 7

[56] References Cited
UNITED STATES PATENTS

| | | | |
|---|---|---|---|
| 3,116,808 | 1/1964 | Riley | 182/187 X |
| 3,358,789 | 12/1967 | Laun | 182/187 X |
| 3,485,320 | 12/1969 | Jones | 182/187 X |
| 3,513,940 | 5/1970 | Ussery | 182/187 |
| 3,749,200 | 7/1973 | Meyer | 182/187 |

Primary Examiner—Paul R. Gilliam
Assistant Examiner—Victor N. Sakran

[57] ABSTRACT

A portable bed intended to be secured to the vertical trunk of a tree or to a horizontal railing support of a fence and the like, the bed consisting of a flat horizontal platform with a vertical upright support member affixed to one side edge thereof and extending downwardly therefrom and to which a plurality of angular braces are affixed and extend to spaced apart positions on the bottom of the platform, the upright support intended to be disposed longitudinally along a side of a tree trunk and provided with a retaining strap to pass circumferally about the tree top and secure the upright support thereto. In addition, the edge of the platform having the upright support secured thereto is provided with a plurality of longitudinally spaced apart openings each adapted to receive one portion of a generally S-shaped hook therein with the hook extending over the side edge of the platform to be secured along the top edge of a horizontally extending fence railing or the like to secure the bed platform to the fence.

5 Claims, 5 Drawing Figures

PATENTED MAR 18 1975
3,871,038
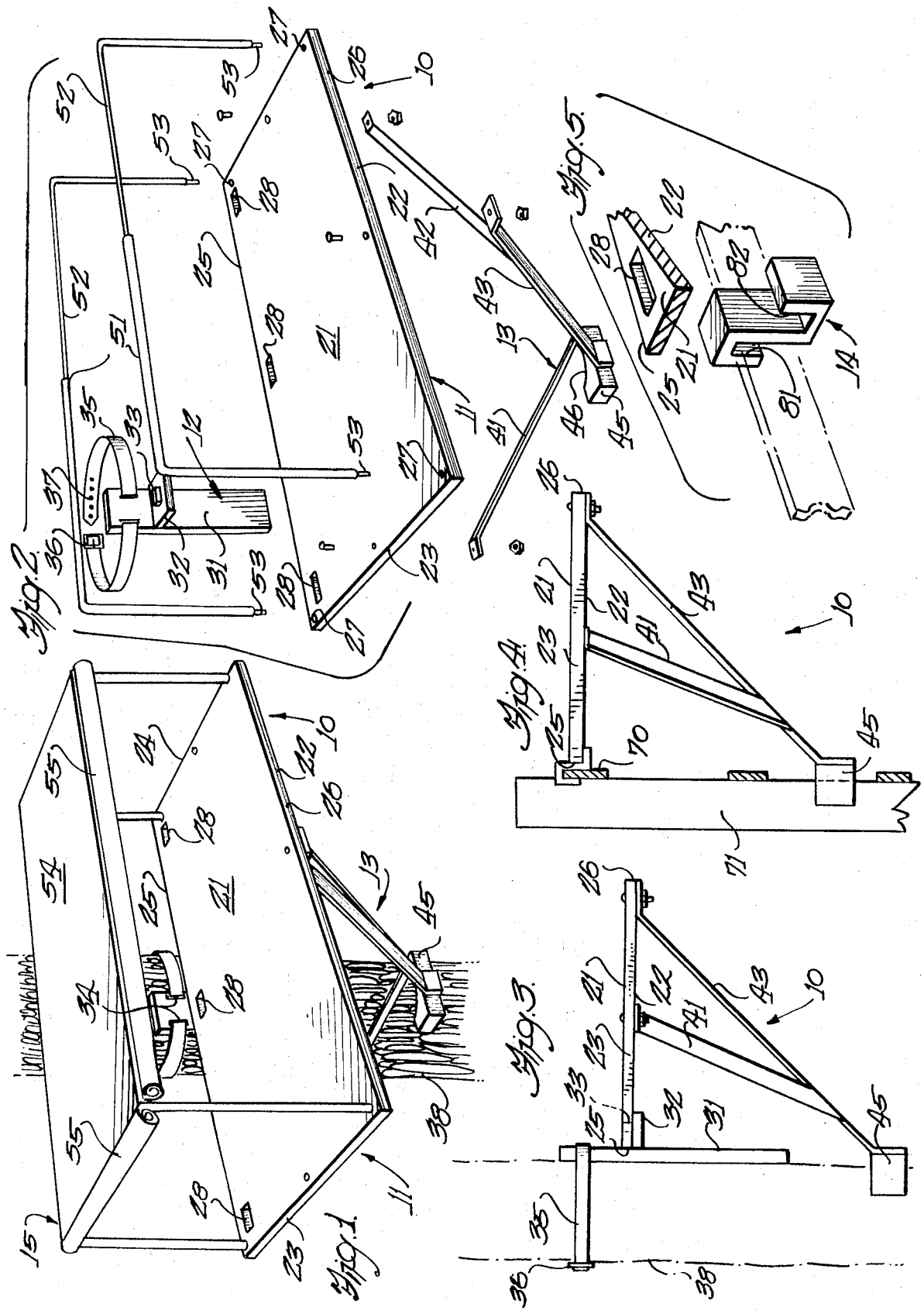

PORTABLE BED

BACKGROUND OF THE INVENTION

1. Field of the Invention

This invention relates generally to portable beds and more particularly to a novel and improved bed structure intended to be rapidly mounted to a vertical tree trunk or supported from a horizontal fence railing to provide portable compact bedding for an individual.

2. Description of the Prior Art

A great variety of portable camping gear and equipment is available for the vast numbers of hunters, campers, fishermen and the like who enjoy outdoor recreational activities. However, this gear is expensive, requires a high level of maintenance to protect the initial cost and investment of the gear, and requires excessive set-up time and dismantling time when setting up and taking down camp. Further, such gear normally results in the individual having to sleep on the ground, protected by the bottom canvas of a tent, a drop cloth, or the like thus requiring the individual prepare and smooth the ground surface on which they are to lie, failure to do so properly leaving uncomfortable depressions, twigs, stones and the like under the individual providing for an uncomfortable night's rest.

SUMMARY OF THE INVENTION

The present invention provides a novel back to nature compact bed which is rapidly assembled and disassembled in an efficient quick manner at the campsite and which is intended to be affixed to a vertical tree trunk or to the top railing of a horizontally extending fence in a manner to provide a sleeping platform for an individual spaced above the ground in a safe and secure manner.

It is a feature of the present invention to provide a portable bed.

A further feature of the present invention provides a portable bed intended to be affixed to a vertical tree trunk at any elevated height therealong such that the individual may sleep at an elevation secure from fear of animals in the vicinity, the bed requiring no damage to the tree whatsoever when being assembled to and disassembled from the tree.

A further feature of the present invention provides a compact bed which is relatively simple in its construction and which therefore may be readily manufactured at a relatively low cost and by simple manufacturing methods utilizing readily available materials such that the bed may be retailed at a sufficiently low price to encourage widespread use thereof and assure its commercial success.

Yet still a further feature of the present invention provides a compact bed which is possessed of few parts and which therefore is unlikely to get out of order and which requires little if any maintenance.

Still yet a further feature of the present invention provides a compact bed which is of a rugged and durable construction and which therefore may be guaranteed by the manufacturer to withstand many years of intended usage.

Still yet a further feature of the present invention provides a compact bed which is easy to use and reliable and efficient in operation requiring no lengthy instructions on use and assembly thereof, and which requires no special tools or expertise for assembly and disassembly of the bed.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the compact bed of the invention as mounted to a vertical tree trunk;

FIG. 2 is an exploded perspective view of the compact bed of the invention;

FIG. 3 is a side elevational view of the compact bed mounted to the vertical tree trunk;

FIG. 4 is a side elevational view of the compact bed mounted to a horizontal fence railing; and FIG. 5 is an exploded fragmentary perspective view of the hooks used to secure the bed to the horizontal fence railing.

DESCRIPTION OF THE PREFERRED EMBODIMENT

Referring now to the drawings in detail there is illustrated a preferred form of a compact bed constructed in accordance with the principles of the present invention and designated generally in its entirety by the reference numeral 10 and which is comprised of a flat platform 11, a vertical supporting bracket 12, supporting braces 13, supporting hooks 14, and a roof and side wall assembly 15.

The platform 11 is of a flat rectangular configuration preferably measuring six feet in length by two to three feet in width and having a top surface 21, a bottom surface 22, opposed end edges 23 and 24, back side edge 25, and front side edge 26. A circular recess 27 is disposed in top surface 21 adjacent each of the corners and is for use with the roof and side wall assembly 15 as will be later described. Spaced in longitudinally spaced apart alignment adjacent to back side edge 25 are three rectangularly shaped openings 28 for use with associated ones of hooks 14 as will be later described.

Affixed centrally to back side edge 25 and extending vertically downwardly and upwardly therefrom is the support bracket 12 which is of an elongated rectangular flat body member 31 with a flange portion 32 projecting outwardly from the front surface thereof and having a rectangularly shaped boss member 33 projecting upwardly therefrom to engage with the center one of openings 28 when flange 32 is placed in juxtaposition with the bottom surface 22 of platform 11 with back side edge 25 abutting the front surface of bracket 31. Disposed above flange 32 are a pair of spaced apart vertically extending slots 34 which receive therethrough a belt or strap 35 having a buckle 36 at one end and aligned opening 37 in the opposite end, the strap being of a length to be fit about a tree trunk 38 with holes 37 received in buckle 36 to retain the bracket 31 to the tree trunk extending vertically at a side thereof.

The braces 13 number three in total with brace 41 having one end bolted centrally of edge 23, brace 42 having one end bolted centrally of edge 24, and brace 43 having one end bolted centrally adjacent edge 26. The braces 41-43 extend downwardly from their bolted end in a manner converging toward a point centrally below the back side edge 25 of the platform, the free ends of flanges 41 and 42 being permanently joined to brace 43 intermediate its ends, with the free end of brace 43 being affixed to a support member 45 having an arcuate interior surface 46 of a curvature adapted to extend circumferally about a portion of tree trunk 38 when the platform 11 is mounted thereto.

The roof and side wall assembly 15 consists of coacting pairs of L-shaped tubing 51 and 52 which are telescopically received in each other and which have pins 53 projecting from their base ends thereof to be received in opening 27 of platform 11 with the members defining rails of a generally inverted U-shape with the bight portions thereof extending generally parallel to the platform. A canvas cover including a roof portion 54 and side portions 55 is then restingly supported over the supports to provide the roof and side walls for the bed.

When desiring to use the bed on a fence and the like having a flat vertically disposed horizontally extending railing 70 which extends between vertical fence posts 71, there are provided the S-shaped hooks 14 which define opposite facing channel slot bight portions 81 and 82, portion 82 receiving therein an opening 28 with portion 81 receiving therein the top edge of the railing 70 so as to secure the back side edge 25 of the platform and thus the platform itself to the fence with support member 45 engaging a portion of the fence post 71 in the same manner as it would have engaged tree trunk 38.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A compact bed intended for support from a vertical tree trunk, a horizontal railing of a fence, and the like, comprising:
    a flat horizontal platform having a top surface, a bottom surface, opposed end edges, a back side edge, and a front side edge;
    a plurality of identical longitudinally aligned spaced apart openings disposed adjacent the back edge and including one opening centrally of the back edge with at least one opening near each back edge corner of the platform;
    a vertical support bracket having a horizontal flange projecting outwardly therefrom normal thereto and intermediate the ends thereof;
    a boss member projecting upwardly from the top surface of the flange member to engage the central opening of the platform to removably mount the platform to the support bracket;
    a pair of vertically extending spaced apart slots disposed in the support bracket above the flange member;
    a flexible strap passing through the slot and having connecting means associated with the ends thereof for securing the ends of the strap together about a tree trunk and the like to removably retain the support bracket thereto extending vertically along a side surface thereof;
    brace means associated with the bottom of the platform and extending downwardly and inwardly therefrom;
    a support member associated with the projecting ends of the brace means and adapted to engage a portion of the supporting tree trunk vertically beneath the supporting bracket; and
    a roof and side wall assembly removably associated with the platform to define a roof cover and side walls and closing the area immediately above the platform to protect an individual sleeping on the platform from the elements of the weather.

2. The compact bed as set forth in claim 1 wherein the brace means comprises three brace elements, the first brace element having one end bolted to the platform bottom surface adjacent one end edge thereof and centrally thereof; a second brace element having one end affixed to the platform bottom surface centrally of the opposite end edge and adjacent thereto; and a third brace element having one end affixed to the platform bottom surface centrally of the front side edge and adjacent thereto; the free ends of each of the three brace elements projecting downwardly and inwardly away from the affixed ends; the free ends of the first and second brace elements being affixed to the third brace element intermediate the ends thereof; and the free end of the third brace element being affixed to the support member.

3. The bed as set forth in claim 2 wherein the roof and side wall assembly comprises:
    a bore disposed in the top surface of the platform adjacent each corner thereof;
    a pair of telescopic supporting elements each of an L-shaped configuration, each pair consisting of a first L-shaped element having a vertical segment and a horizontal segment, and a second telescopic element having a vertical segment and a horizontal segment, the second element horizontal segment being telescopically received in the first element horizontal segment, the vertical segments of the first and second elements each defining base ends adapted to be axially inserted into associated corner bores along a side edge of the platform with the horizontal elements extending parallel to the platform and spaced vertically thereabove;
    a flexible roof member having flexible side flap members affixed thereto and extending outwardly therefrom, the roof member adapted to be supported atop the pairs of support brackets with the side wall elements extending downwardly to the platform to completely enclose the sleeping area defined above the top surface of the platform.

4. The bed as set forth in claim 3 further characterized by a plurality of S-shaped hook members including a vertically upward extending hook member and a vertically downward extending hook member, the vertically upward extending hook member intended to be engaged in one of the openings along the back side edge of the platform, the vertically downward extending hook member adapted to be hooked to a top horizontal edge of a fence railing when the platform is to be secured to a fence railing rather than to a tree trunk.

5. The bed as set forth in claim 4 wherein the support member includes a leading edge having a concave arcuately shaped recess formed therein adapted to circumferally engage a portion of the tree trunk when the bed is mounted thereto, and to engage a portion of a fence post when the bed is mounted to a fence.